(12) United States Patent
Bare et al.

(10) Patent No.: US 9,311,227 B2
(45) Date of Patent: Apr. 12, 2016

(54) MEMORY MANAGEMENT

(75) Inventors: Ballard C. Bare, Auburn, CA (US);
Shaun K. Wakumoto, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 2747 days.

(21) Appl. No.: 11/590,497

(22) Filed: Oct. 31, 2006

(65) Prior Publication Data

US 2008/0104086 A1 May 1, 2008

(51) Int. Cl.
*G06F 12/12* (2006.01)
*G06F 12/02* (2006.01)
*G06F 3/06* (2006.01)

(52) U.S. Cl.
CPC .............. *G06F 12/023* (2013.01); *G06F 3/067* (2013.01); *G06F 3/0644* (2013.01)

(58) Field of Classification Search
CPC ...... G06F 12/023; G06F 3/067; G06F 3/0644
USPC .......................................................... 711/170
See application file for complete search history.

(56) References Cited

U.S. PATENT DOCUMENTS

| 4,606,002 | A | * | 8/1986 | Waisman et al. | |
|---|---|---|---|---|---|
| 5,838,994 | A | * | 11/1998 | Valizadeh | 710/56 |
| 6,286,088 | B1 | | 9/2001 | Campbell et al. | |
| 6,408,313 | B1 | | 6/2002 | Campbell et al. | |
| 6,463,515 | B1 | | 10/2002 | Stedman et al. | |
| 6,594,749 | B1 | | 7/2003 | Czajkowski | |
| 6,832,303 | B2 | | 12/2004 | Tanaka | |
| 6,907,508 | B2 | | 6/2005 | Dearth et al. | |
| 6,941,436 | B2 | * | 9/2005 | Lee et al. | 711/173 |
| 6,941,437 | B2 | | 9/2005 | Cook et al. | |
| 7,058,782 | B2 | | 6/2006 | Henderson et al. | |
| 7,103,747 | B2 | | 9/2006 | Wilson et al. | |
| 2002/0078002 | A1 | | 6/2002 | Bottomley et al. | |
| 2003/0135619 | A1 | * | 7/2003 | Wilding et al. | 709/225 |
| 2006/0069898 | A1 | | 3/2006 | Patel et al. | |
| 2006/0149915 | A1 | | 7/2006 | Maly | |
| 2006/0155949 | A1 | | 7/2006 | Purushothaman | |
| 2007/0067665 | A1 | * | 3/2007 | Hashemi | 714/6 |

\* cited by examiner

*Primary Examiner* — Jae Yu
(74) *Attorney, Agent, or Firm* — Mannava & Kang, P.C.

(57) ABSTRACT

Methods and devices are provided for memory management. One embodiment includes creating a memory control block including a number of sub-blocks, where the number of sub-blocks are capable of storing at least one data structure in a memory device. The method also includes scanning the control block for a free-able data structure having a defined data structure property, marking the free-able data structure as free-able in a bit map, and de-allocating the free-able data structure.

20 Claims, 5 Drawing Sheets

MEMORY MANAGEMENT

BACKGROUND

In a computing system, memory space can be allocated for use by a computing process. A "memory space" includes a number of positions in a memory of a computing device, each position corresponds to a unit of memory, such as, for example, a byte or word. A process uses items stored in the physical memory, for example, random access memory (RAM) that is installed in a computing device. In some computing systems, memory is de-allocated and made available for subsequent allocation once a process is finished using the memory.

In some systems, status information can be maintained for each portion of the memory space. Such status information can indicate whether the memory is allocated and, therefore, not available. Memory allocation is typically performed on a block basis, where memory blocks are allocated to a given process. A "memory block" is a contiguous portion of memory locations.

Management of the computing device's memory typically includes three operations: allocation, de-allocation, and consolidation. In the allocation phase, the computing device receives a request for a memory block and identifies one or more non-allocated blocks of memory to fill that request. The computing device can then allot the identified one or more blocks by marking the blocks as allocated and then communicating to the requesting process that the identified memory blocks are available for use. In the de-allocation phase, the computing device receives a communication indicating that a process is done with one or more previously allocated blocks of memory and then marks the one or more blocks as being available for subsequent allocation.

In allocating and de-allocating the memory, the computing device can fragment the memory into a number of blocks. If this process is continued unchecked, the memory can be divided into many small blocks of unused memory. In such instances, the computing device may have to satisfy allocation requests for memory by providing a large number of small blocks, even though a substantial portion of the memory space remains unused. This memory fragmentation can be inefficient in the use of the memory space and can result in lower computing efficiency.

To alleviate memory fragmentation, in the consolidation phase, the computing device can attempt to join one or several contiguous blocks of available memory to form a larger contiguous memory block. Thus, consolidation, also referred to as coalescing or defragmentation, can rearrange allocated fragments so that unused portions of the memory space are combined.

DETAILED DESCRIPTION

Embodiments of the present disclosure include methods and devices, including executable instructions, for memory management. For example, one computer readable medium embodiment includes instructions for causing a device to perform a method. The method performed in this embodiment includes storing at least one data structure in a number of sub-blocks, where the number of sub-blocks are included in a control block. The method also includes scanning the control block for a free-able data structure, marking the free-able structure as free-able in a bit map, and de-allocating the free-able data structure.

As discussed herein, the control block can be a block of a computing device's memory that is further divided into smaller sub-blocks of a computing device's memory. The memory can include data structures such as executable instructions and data, including semaphores, allocation statistics, and the sub-block parameters, as discussed herein. The sub-blocks can be portions of the control block that is further divided into sub-block spaces that can store the data structures. One or more sub-blocks can also include a bit map, among other things.

A data structure can be any piece of information that a computing device can store, for example, an IP address or state, a port location or state, and/or a file, among others. A free-able data structure, as it is used herein, refers to a data structure with a free-able data structure property that can be de-allocated, as discussed herein.

A bit map can be a representation of the data structures stored in one or more of the sub-blocks. In various embodiments, one or more data structures in a sub-block can be represented in the map with a bit, or a binary digit. In other words, when a data structure is present in a sub-block, the bit map can, for example, have a "1" to indicate where in the sub-block the data structure is stored. Correspondingly, in such embodiments, the bit map can have a "0" to indicate that a data structure is not being stored in a sub-block space.

The Figures herein follow a numbering convention in which the first digit or digits correspond to the drawing figure number and the remaining digits identify an element in the drawing. Similar elements between different figures may be identified by the use of similar digits. For example, 102 may reference element "102" in FIG. 1, and a similar element may be referenced as "202" in FIG. 2. As will be appreciated, elements shown in the various embodiments herein can be added, exchanged, and/or eliminated so as to provide a number of additional embodiments.

Figure 1:
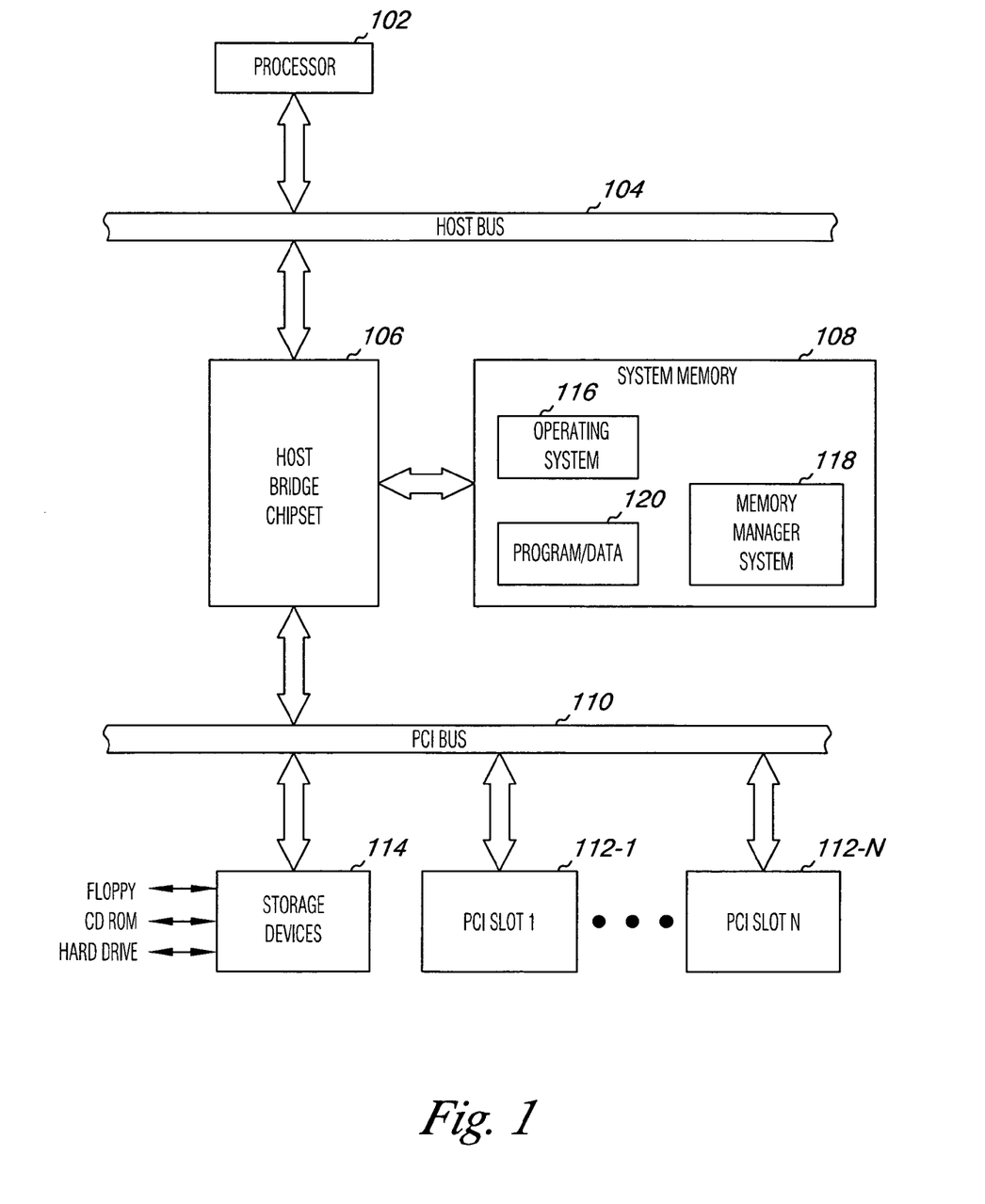
FIG. 1 illustrates an example of a computing device suitable to implement embodiments of the present disclosure.

FIG. 1 illustrates an example of a computing device suitable to implement embodiments of the present disclosure. The term "a" should be construed herein to mean "one or more" unless a component is explicitly stated as singular or unless multiple components would be impractical. Further, the use of "N" also indicates "one or more" unless a specific number of components is explicitly stated as limiting the number of components.

The system or computing device 100 shown in FIG. 1 illustrates a processor 102, a host bus 104, a host bridge chipset 106, a system memory 108, a peripheral component interconnect (PCI) bus 110, PCI slots (e.g., slots for I/O circuit cards, controller cards, and other removable devices) 112-1 to 112-N (where N represents a scalable number), and one or more storage devices shown generally as 114.

The processor 102 can be of various architectures. For example, the processor 102 can have an architecture capable of supporting a range of page sizes (e.g., precision architecture reduced instruction set computer (PA-RISC), Itanium Processor Family (IPF), etc.). Embodiments of the disclosure can be implemented in a multi-processor or single processor system or computing device. Embodiments described herein can similarly be implemented in a distributed computing network environment.

The host bridge chipset 106 includes a number of interface circuits to allow the host processor 102 to access the system memory 108 and the PCI bus 110. The system memory 108 represents one or more mechanisms for storing information. For example, the system memory 108 may include non-volatile and/or volatile memories. Examples of these memories include flash memory, read only memory (ROM), random access memory (RAM), etc. The system memory 108 may be loaded with an operating system (OS) 116, e.g., in ROM. Examples of operating systems include, but are not limited to, Windows, Mac, Unix, Linux, etc. A basic input/output system (BIOS) is also stored in ROM in the system memory 108.

In the embodiment illustrated in FIG. 1, the system memory 108 further includes a memory manager 118 and other programs and data 120. The memory manager 118 can include programs, code, data, look-up tables (e.g., page tables), and other such data and/or instructions to support the management of memory in connection with processes, such as those within program applications being executed by the processor 102. The memory manager 118 can include instructions for managing memory, memory data structures, etc. The system memory 108 may also contain additional types of executable instructions for various other computing device or system functions.

The PCI slots 112-1 to 112-N provide interfaces to PCI devices. Examples of PCI devices can include printers, facsimiles, scanners, network interface devices, media interface devices, etc. Storage devices 114 can include electronic, magnetic, and/or optical media devices such as hard drives, flash memory devices, CD ROMs, DVDs, and tapes, among other media device types. Embodiments, however, are not limited to these examples. In some embodiments, PCI slots can be used to connect storage devices to the device or system.

As discussed herein, a memory manager can include instructions for managing memory, memory data structures, etc. For example, the memory manager can be used to prevent fragmentation by partitioning the memory into blocks larger than a typical allocation request and managing the blocks so that memory is not freed to a memory pool until a threshold amount of memory is ready to be freed.

Figure 2:
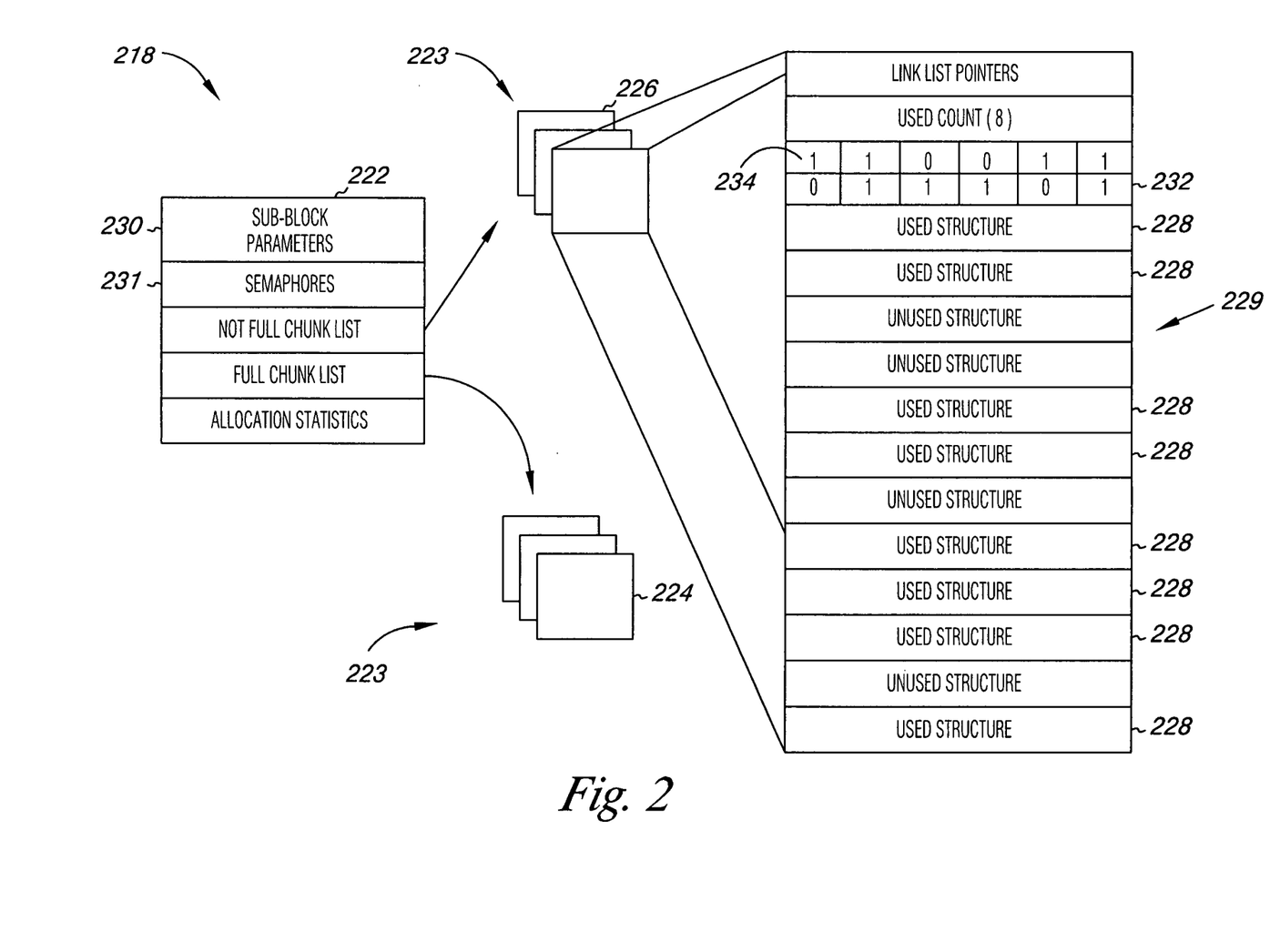
FIG. 2 is a block diagram of an embodiment of the memory manager according to the present disclosure.

FIG. 2 is a block diagram of an embodiment of a memory manager according to the present disclosure. In this embodiment, the memory manager 218 includes a control block 222. The control block 222 can include a number of sub-blocks 223, where the sub-blocks are separated into full sub-blocks 224 and partially full sub-blocks 226. Each sub-block 223 is capable of storing at least one data structure 228 in a predetermined number of sub-block spaces 229. In some embodiments, for example, a data structure 228 may include an IP address, the age of the IP address, and the IP address interface, among other information.

In some embodiments, when a control block 222 is created, a user can specify a number of sub-block parameters 230. The sub-block parameters 230 can, for example, include the size of the data structures 228 to be stored in a sub-block space 229. Constraining the sub-blocks 223 in the control block 222 to a fixed data structure 228 size provides for greater efficiency as the device does not have to use variable-size sub-block management, which may be beneficial in that variable-size sub-blocks typically have to utilize size information associated with them, and the memory manager 218 has to read and manage this information.

In some embodiments, the sub-block parameters 230 can also include how many data structures 228 are allocated per sub-block 223 when the control block 222 is created, a threshold number of data structures 228 that will be allocated in the control block 222, a threshold number of data structures 228 a sub-block 223 can store, and a threshold percentage of free space in a sub-block 223 that is to be used before a sub-block 223 can be released into a memory pool. Other sub-block parameters 230 are also possible.

As used herein, the "memory pool" refers to the free memory in the control block that has not yet been organized into a sub-block. For example, the user can specify the size of the one or more data structures to be stored in a sub-block, how many data structures 228 each sub-block 223 can store, and a threshold number of data structures 228 the control block 222 can store, however the number of sub-blocks 223 can be variable since the number of sub-blocks 223 can depend on how the sub-block spaces 229 end up being allocated.

For example, if the memory manager 218 allocates a large number of small memory allocation requests, there may have to be a larger number of sub-blocks 223 holding less data structures 228 as compared to if the memory manager 218 had allocated the same amount of memory, but for, for example, a single memory allocation request. Since the number of sub-blocks 223 can be variable, the memory manager 218 can create the sub-blocks 223 as it receives memory allocation requests from the memory pool.

In some embodiments, the memory manager 218 can list the specified sub-block parameters 230 for review by a user. The memory manager 218 can also return other status elements, including, but not limited to, a number of data structures 228 allocated, a number of free sub-block spaces 229, a threshold number of sub-block spaces 229 historically used, a total number of bytes currently allocated, a threshold number of bytes historically allocated, a number of times a memory allocation request has been denied, a number of sub-blocks 223 that are completely full, a total number of sub-blocks 223 allocated, and a number of data structures 228 marked to be de-allocated in a bit map, as discussed further herein, among others. In some embodiments, the memory manager 218 can print a list of sub-block parameters and status elements in a user-friendly format. In addition, in some embodiments, the sub-block parameters and status elements can be updated when a data structure and/or group of data structures are de-allocated and/or allocated.

In some embodiments, the control block 222 can contain semaphores 231 unique to the control block 222 so that multiple processes may share sub-blocks 223 from a common control block 222. When processes share sub-blocks 223, the semaphore 231 may be set and released by a user.

In some embodiments, each sub-block 223 can contain an allocated sub-block space bit map 232. For example, each data structure 228 stored in a sub-block space 229 can have a corresponding status bit 234 indicating that the sub-block space 229 is storing a data structure 228. A bit map 232 can provide the memory manager 218 with a way to obtain a list of allocated sub-block spaces 229 for each sub-block 228. In some embodiments, the bit map 232 can contain a binary status key for storing a value (e.g., a Boolean value) indicating free memory. As illustrated in the embodiment of FIG. 2, the status bit 234 corresponding to each sub-block space 229 can indicate, for example, a "1" in the bit map 232 to show that the sub-block space 229 is allocated and where, in the sub-block 223, the data structure 228 is stored. In such embodiments, if the sub-block 223 has an unallocated sub-block space 229, the bit map 232 can indicate a "0" to show that the sub-block 223 has unallocated sub-block spaces 229 that are free for allocation and, in some embodiments, the location of those sub-block spaces 229.

In various embodiments, one or more of the sub-blocks 223 can include information about how many sub-block spaces 229 are currently storing a data structure 228, and/or information identifying each sub-block 223. For example, a pointer and/or link list can be used to indicate such information.

As discussed herein in some embodiments, the memory manager 218 can keep partially full sub-blocks 226 separate from full sub-blocks 224. In such embodiments, the memory manager 218 can be designed to arrange the partially full sub-blocks 226 in descending fullness order, among other organizational schemes.

As used herein, "descending fullness order" refers to an arrangement where the sub-blocks 226 that have the greatest amount of data structures 228 stored in the sub-block spaces 229 are at the top of the order, and the sub-blocks 226 that have the least amount of data structures 228 stored in the sub-block spaces 229, are at the bottom of the order. This arrangement can promote fast allocation access, in some embodiments, since new memory is allocated from the sub-block 226 at the head of the partially full list. Also, in such embodiments, by keeping the partially full sub-blocks 226 in descending fullness order, the probability that a sub-block 226 at the end of the partially full list will completely empty and be returned to the memory pool is increased.

In addition, in some embodiments, as data structures 228, stored in the full sub-blocks 224, are de-allocated, the partially full sub-block list can be updated to include the previously full sub-block 224. Likewise, once a partially full sub-block 226 has become full, the full sub-block list can be updated to include the previously partially full sub-block 226.

Figure 3:
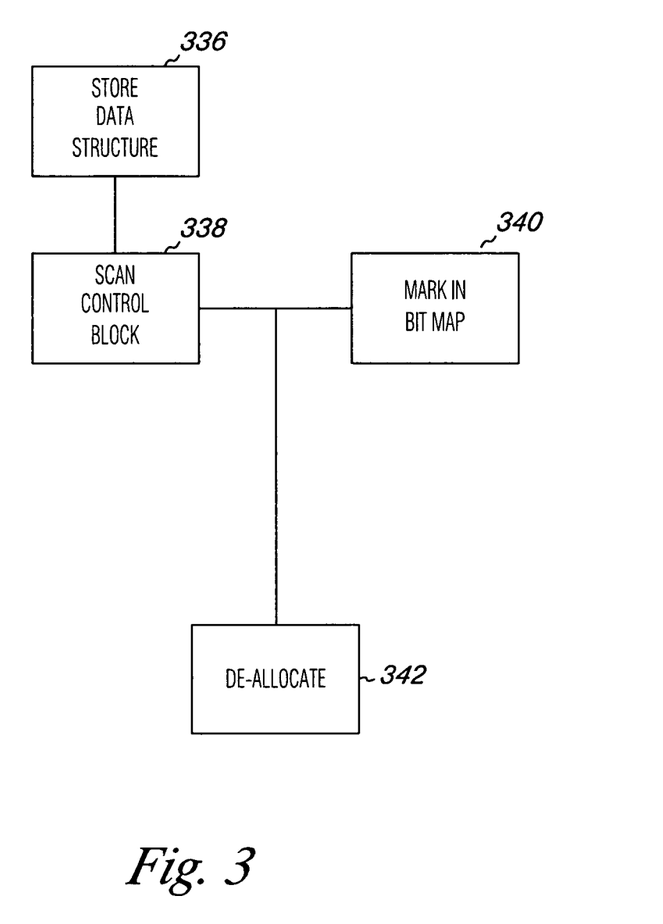
FIG. 3 is a block diagram of a method embodiment.

FIG. 3 is a block diagram of a method embodiment. Unless explicitly stated, the method embodiments described herein are not constrained to a particular order or sequence. Additionally, some of the described method embodiments or elements thereof can occur or be performed at the same point in time.

The embodiments described herein can be performed by software and/or firmware (e.g., computer executable instructions), hardware, application modules, and the like, executable and/or resident on the systems and devices shown or described herein or otherwise. The embodiments of the present disclosure are not limited to any particular operating environment or to instructions written in a particular programming language. Software, firmware, and/or processing modules, suitable for carrying out embodiments of the present disclosure, can be resident in one or more devices or locations.

In FIG. 3, a block diagram shows elements in an embodiment of a method of the present disclosure. As shown at block 336, the method includes storing a data structure in a number of sub-blocks, where the sub-blocks are included in a control block. As discussed herein, a control block can be created by specifying the control block parameters. In addition, a data structure can be stored in a sub-block when a control block is created, or in response to a memory allocation request, as discussed herein.

As shown at block 338, the method includes scanning the control block. In some embodiments, a user can define a data structure property, where all data structures having the defined data structure property are to be freed from the sub-block memory. In such embodiments, once the user has defined the free-able data structure property, the scan can start at a sub-block, and proceed by examining each sub-block to find data structures having the free-able data structure property until the free-able data structures are found, or the end of the control block is reached.

For example, when the data structures being stored in the control block are a number of IP addresses and the IP address age of the addresses, a user can specify that the free-able data structure property is an IP address age of greater than or equal to five (5) years. In this example, once the scan is started, each sub-block can be examined for IP addresses that have an age greater than or equal to five (5) years.

Once a data structure is found that has an IP address of greater than or equal to five (5) years, the data structure can be marked as a free-able data structure in the sub-block's bit map. In addition, after the scan has reached the end of the control block, the free-able data structures can be de-allocated.

As discussed herein, the control block can have a list of partially full sub-blocks arranged in descending fullness order. In some embodiments, the scan of the control block can start at the top of the list of partially full sub-blocks and continue until it reaches the end of the partially full sub-blocks.

As shown at block 340, as the scan of the control block is in progress, when the scan finds a data structure that has the free-able data structure property, the location of the data structure can be marked in a bit map of each sub-block, as discussed herein. Once the scan of the control block reaches the end of the control block, and all the free-able data structures have been marked in each sub-block's bit map, the data structures marked as free-able on each bit map of each sub-block can be freed, or de-allocated, as shown at block 342.

In some embodiments, by freeing the free-able data structures at once, the overhead of the memory manager can be reduced. Overhead is generally considered any combination of excess or indirect computation time, memory, bandwidth, or other resources that are to be utilized or expended to enable a particular goal. In this case, since the free-able data structures are freed at one time, the memory manager has to scan through the bit map to coalesce memory once and it has to check for large enough memory spaces to pass to processes waiting for memory once instead of having to scan separately each time a single data structure is de-allocated. In addition, in situations where multiple sub-blocks can be coalesced, there may be fewer link list header updates.

Figure 4:
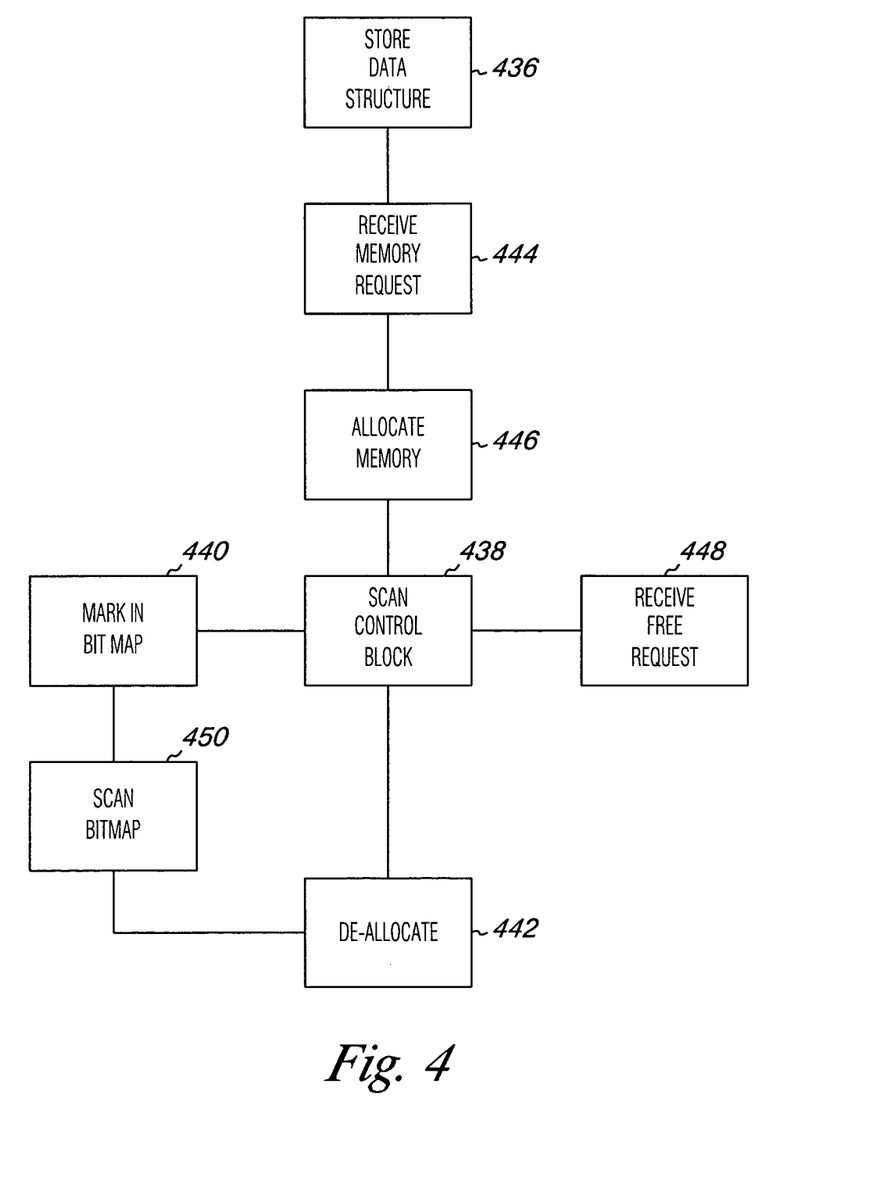
FIG. 4 is a block diagram of a method embodiment.

FIG. 4 is a block diagram of a method embodiment. FIG. 4 illustrates a method embodiment similar to that shown in FIG. 3, where the method includes additional elements. As shown at block 436, the method includes storing a data structure in a number of sub-blocks included within a control block, as discussed herein.

As shown at block 444, the method includes receiving a memory request from a user and/or a process. When a user or process requests memory from the control block, the memory manager can walk through the list of partially free sub-blocks until it reaches a group of sub-block spaces that will store the amount of memory requested. Once the memory manager has found where the memory can be allocated, it can allocate the memory, as shown at block 446, and place a pointer to the location.

In some embodiments, the allocation process can be separate from a de-allocation process and/or scan of the control block for a free-able data structure and/or a first data structure, as discussed herein. In some embodiments, the memory manager can allocate a new sub-block from the memory pool if the threshold number of data structures has not been allocated, as specified in the control block parameters, as discussed herein.

In some embodiments, the memory manager can walk through the list of partially free sub-blocks in fullness descending order. In this way, the memory manager can allocate memory from the sub-blocks that are the most full, for example. As discussed herein, in various embodiments, this method can increase the probability that the sub-blocks at the bottom of the partially full sub-block list will have data structures that are de-allocated, creating an empty sub-block that can be released into a memory pool.

In some embodiments, the memory manager can check whether a data structure has been de-allocated before it allocates memory. For example, once the memory manager receives a memory allocation request and the memory manager has found a location to store the memory, the memory manager can check the particular sub-block spaces and/or spaces.

The memory manager can then, for example, return a "0" if the sub-block space is valid and allocated, a "1" if the sub-block space is within the current sub-block at the correct location and not currently allocated, and a "2" if the sub-block block space is within the current sub-block at the correct location but has been marked in a bit map to be de-allocated but has not yet been de-allocated. Other values can also be returned indicating, for example, whether the memory is not located in the current sub-block, and/or whether the memory is within the sub-block but not in the correct location, among others.

In some embodiments, the memory manager can update the fullness descending order of the partially full sub-blocks every time a data structure and/or group of data structures are de-allocated. In addition, in some embodiments, a scan of a control block can continue through the partially full sub-blocks as they are arranged in the fullness descending order.

In such embodiments, if the memory manager receives a de-allocate request for a specific data structure, or first data structure, while a scan of the control block is in progress, the de-allocate request could free the first data structure while the scan is in progress, causing the arrangement of the partially full sub-blocks to change. In some embodiments, the rearrangement could cause the scan of the control block to miss data structures that have the free-able data structure property.

To avoid such occurrences, a user or system can delay all de-allocate requests before a scan of the control block is started. As discussed herein, at block 438, a user can define a free-able data structure property and scan the control block for data structures having the free-able data structure property, where the data structures having the free-able data structure property are to be freed from the sub-block memory. In some embodiments, as the scan of the control block is in progress, the memory manager can receive a de-allocate request for a specific data structure, or a first data structure, as shown at block 448. In such embodiments, the de-allocate request for the first data structure can be treated as if the first data structure had the free-able data structure property, and the location of the first data structure can be marked in a bit map, as shown at block 440, thus delaying the de-allocate request for the first data structure.

In addition, as discussed herein, while the scan is in progress the one or more locations of the data structures having the free-able data structure property can also be marked in the bit map. Once the scan of the control block reaches the end of the control block, the free-able data structures have been marked in each sub-block's bit map, and the first data structure has been marked in the sub-block's bit map, the data structures marked as free-able on each bit map of each sub-block can be freed, or de-allocated, as shown at block 442.

As shown at block 450, in some embodiments, the method can include scanning a marked bit map to check that the marked data structures have the free-able data structure property before the data structures corresponding to the marked bit map are de-allocated. In addition, in some embodiments, a memory manager can check to determine whether the de-allocate request is a legal request for each data structure marked on a bit map, as discussed herein.

Figure 5:
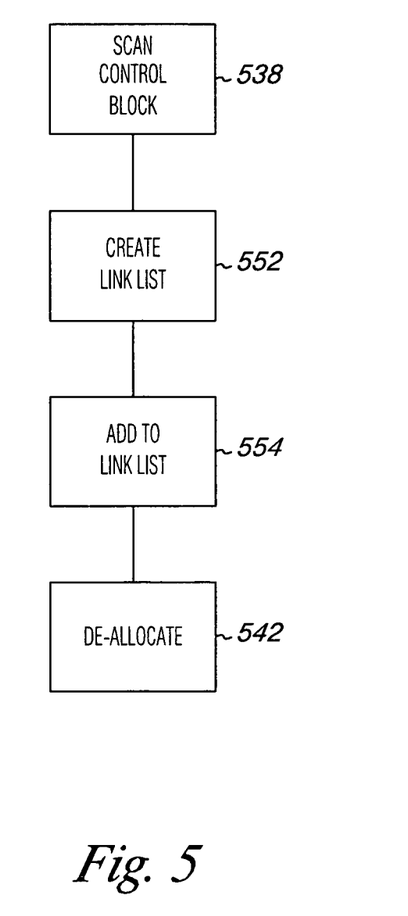
FIG. 5 is a block diagram of a method embodiment.

FIG. 5 is a block diagram of a method embodiment. As shown at block 538, the method includes scanning a control block using a free-able data structure property, as discussed herein. In some embodiments, the each sub-block in a control block can contain a link list header, as discussed herein. In such embodiments, as the scan of the control block progresses and the scan identifies data structures having the free-able data structure property, the memory manager can create a link list, as shown at block 552, and add to the link list data structures that are to be de-allocated, as shown at block 554.

In some embodiments, data structures can be added to the link list using memory that is to be freed once the data structures having the free-able data structure property are de-allocated. In such embodiments, the memory for the link list is freed once the free-able data structures are de-allocated, while the memory to store the link list header in each sub-block remains allocated.

In some embodiments, the memory manager can check to determine whether the de-allocate request is a legal request for each data structure before adding it to the link list. For example, the memory manager can check to determine whether the data structure actually exists in the sub-block or whether the sub-block space is not allocated.

Once the scan of the control block is complete, the data structures having the free-able data structure property added to the link list can be de-allocated, as shown at block 542. In some embodiments, after the scan of the control block is complete, the link list can be scanned to check that the data structures identified on the link list have the free-able data structure property. In addition, in some embodiments, once the data structures have been de-allocated, the memory manager can scan the control block for empty sub-blocks and/or sub-blocks with the threshold percentage of free space, and release the sub-blocks into the memory pool.

In various embodiments, instructions can be executed by one or more devices to perform each of the elements represented in FIGS. 3-5, as described herein.

Although specific embodiments have been illustrated and described herein, those of ordinary skill in the art will appreciate that an arrangement calculated to achieve the same techniques can be substituted for the specific embodiments shown. This disclosure is intended to cover all adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure include more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory computer readable medium on which are stored instructions that when executed by a device, cause the device to perform a memory management method, comprising:
   storing at least one data structure in a number of sub-blocks, where the number of sub-blocks are included in a control block;
   arranging the number of sub-blocks into a descending fullness order;
   scanning the control block for a free-able data structure having a defined data structure property;
   marking the free-able data structure as free-able in a bit map; and
   de-allocating the free-able data structure.

2. The medium of claim 1, wherein the method includes:
   receiving a de-allocate request for a first data structure;
   marking the first data structure as free-able in the bit map; and
   de-allocating the first data structure after the scan of the control block is completed.

3. The medium of claim 2, wherein the method includes de-allocating the first data structure and the free-able data structure at a same time.

4. The medium of claim 1, wherein the method includes scanning the bit map for a data structure not having the defined data structure property.

5. The medium of claim 1, wherein scanning the control block for the free-able data structure includes scanning each of the number of sub-blocks in the descending fullness order.

6. The medium of claim 1, wherein the method includes allocating memory from the number of sub-blocks in the descending fullness order in response to a request for a memory allocation from a requesting process.

7. The medium of claim 1, where the number of sub-blocks are capable of storing at least one data structure of a predetermined size.

8. The medium of claim 1, wherein the de-allocating comprises de-allocating using the marking in the bit map which indicates that the free-able data structure is free-able.

9. A method for memory management in a computing system having a memory device, comprising:
   scanning a control block for a free-able data structure, where the control block includes a number of sub-blocks capable of storing at least one data structure in the memory device;
   arranging the number of sub-blocks into a descending fullness order;
   creating a link list;
   adding the free-able data structure to the link list; and
   de-allocating the free-able data structure into a memory pool after the scan of the control block is completed.

10. The method of claim 9, wherein creating the link list includes using memory to be freed to store the link list.

11. The method of claim 9, wherein the method further includes creating a list of the number of sub-blocks that contain a threshold number of data structures.

12. The method of claim 11, wherein the list of the number of sub-blocks that contain the threshold number of data structures is separate from the number of sub-blocks in the descending fullness order.

13. A memory manager comprising a processing device coupled to a memory, the memory storing instructions that are to cause the processing device to:
   store a predetermined number of data structures in a number of sub-blocks, where the number of sub-blocks are included in a control block;
   arrange the number of sub-blocks into a descending fullness order;
   allocate memory in response to a request for a memory allocation from a requesting process;
   scan the control block for a free-able data structure;
   receive a de-allocate request for a first data structure, where the de-allocate request is received during the scan of the control block;
   mark the first data structure and the free-able data structure as free-able in a bit map; and
   scan the bit map and de-allocate the first data structure and the free-able data structure.

14. The memory manager of claim 13, wherein the processing device is operative to scan the control block for a sub-block large enough to allocate memory in response to the request for the memory allocation from the requesting process.

15. The memory manager of claim 13, wherein the processing device is operative to check that the de-allocate request for a first data structure is a valid request.

16. The memory manager of claim 13, wherein the processing device is operative to set a threshold number of data structures stored in the number of sub-blocks.

17. The memory manager of claim 16, wherein the processing device is operative to set a threshold percentage of free space in the sub-block before the sub-block can be released in a memory pool.

18. The memory manager of claim 13, wherein the processing device is operative to scan the number of sub-blocks for an empty sub-block and free the empty sub-block into a memory pool.

19. The memory manager of claim 18, wherein the processing device is operative to scan the number of sub-blocks for a sub-block containing a threshold percentage of free space in the sub-block and free the sub-block containing the threshold percentage of free space into the memory pool.

20. A non-transitory computer readable medium on which is stored instructions that when executed by a processor, cause the processor to:
   store at least one data structure in a number of sub-blocks, where the number of sub-blocks are included in a control block;
   scan the control block for a free-able data structure having a defined data structure property;
   mark the free-able data structure as free-able in a bit map; and
   de-allocate the free-able data structure from one of the sub-blocks, and wherein another data structure present and allocated in the one of the sub-blocks before the de-allocating remains present and allocated in the one of the sub-blocks after the de-allocating of the free-able data structure.

* * * * *